United States Patent [19]

Stelmach

[11] Patent Number: 5,169,193

[45] Date of Patent: Dec. 8, 1992

[54] MAGNETIC PICKUP TOOL

[76] Inventor: John J. Stelmach, 1607½ Idylwild, Prescott, Ariz. 86301

[21] Appl. No.: 804,813

[22] Filed: Dec. 9, 1991

[51] Int. Cl.$^5$ .............................. B25J 1/02; B25J 15/06
[52] U.S. Cl. .................................................. 294/65.5
[58] Field of Search .................... 294/19.1, 65.5, 100;
    81/64, 125, 177.6; 335/285, 293, 294, 302, 303

[56] References Cited

U.S. PATENT DOCUMENTS

| | | |
|---|---|---|
| 512,381 | 1/1894 | Keyes . |
| 1,521,173 | 12/1924 | Catching . |
| 1,597,500 | 8/1926 | Alexander et al. . |
| 1,680,599 | 8/1928 | Edson . |
| 2,218,825 | 10/1940 | Guillow . |
| 2,372,930 | 4/1945 | Bovee ........................ 294/65.5 X |
| 2,417,762 | 3/1947 | Koller ............................ 294/65.5 |
| 2,428,864 | 10/1947 | Boyd .............................. 294/65.5 |
| 2,471,764 | 5/1949 | Miller et al. ................... 294/65.5 |
| 2,517,325 | 8/1950 | Lamb . |
| 2,547,990 | 4/1951 | Willms ........................... 294/65.5 |
| 2,683,618 | 7/1954 | Long ............................... 294/65.5 |
| 2,693,979 | 11/1954 | Russell ........................... 294/65.5 |
| 2,704,005 | 3/1955 | Clayson ........................ 81/177.6 |
| 2,970,002 | 1/1961 | Laviano ........................ 294/65.5 |
| 2,993,723 | 7/1961 | Twachtman ................... 294/65.5 |
| 3,169,791 | 2/1965 | Twachtman ................... 294/65.5 |
| 3,582,123 | 6/1971 | Kyser ............................. 294/19.1 |
| 3,771,084 | 11/1973 | Thon .............................. 335/285 |
| 3,789,336 | 1/1974 | Gordin ........................... 335/285 |
| 4,105,239 | 8/1978 | Akczinski ....................... 294/65.5 |
| 4,813,729 | 3/1989 | Speckhart ...................... 294/65.5 |

FOREIGN PATENT DOCUMENTS

| | | | |
|---|---|---|---|
| 2407796 | 7/1979 | France ............................ 294/65.5 |
| 483431 | 7/1953 | Italy ............................... 294/65.5 |
| 584156 | 1/1947 | United Kingdom ............ 294/65.5 |

Primary Examiner—Johnny D. Cherry
Attorney, Agent, or Firm—Richard G. Harrer

[57] ABSTRACT

A magnetic pickup tool including a length of highly flexible tubing with a permanent magnet secured to one end of the tubing. Removably positioned within the interior of the flexible tube is a stiffening member such as a length of iron wire of about the same length as the flexible tubing. The stiffening member is bendable but when bent has the ability to take a "set". A second length of flexible tubing completely surrounds the first or inner tubing and is slidable thereon. The function of the outer tube is to surround the magnetic tip when the tool is in the process of being positioned to pick up an object so as to prevent the magnetic tip of the tool from being attracted to an unwanted metal object. After the tool has been positioned at or near the object to be picked up, the user then grasps the outer tube and pulls it away from the magnetic tip exposing the tip to make contact with the desired object. A further feature of the tool is that the stiffening member is removable. Thus, where the tool is being used to retrieve an object which requires that the tool have a very high degree of flexibility, the stiffening member is removed and then the entire length of the tool can be bent in virtually any type of configuration.

3 Claims, 1 Drawing Sheet

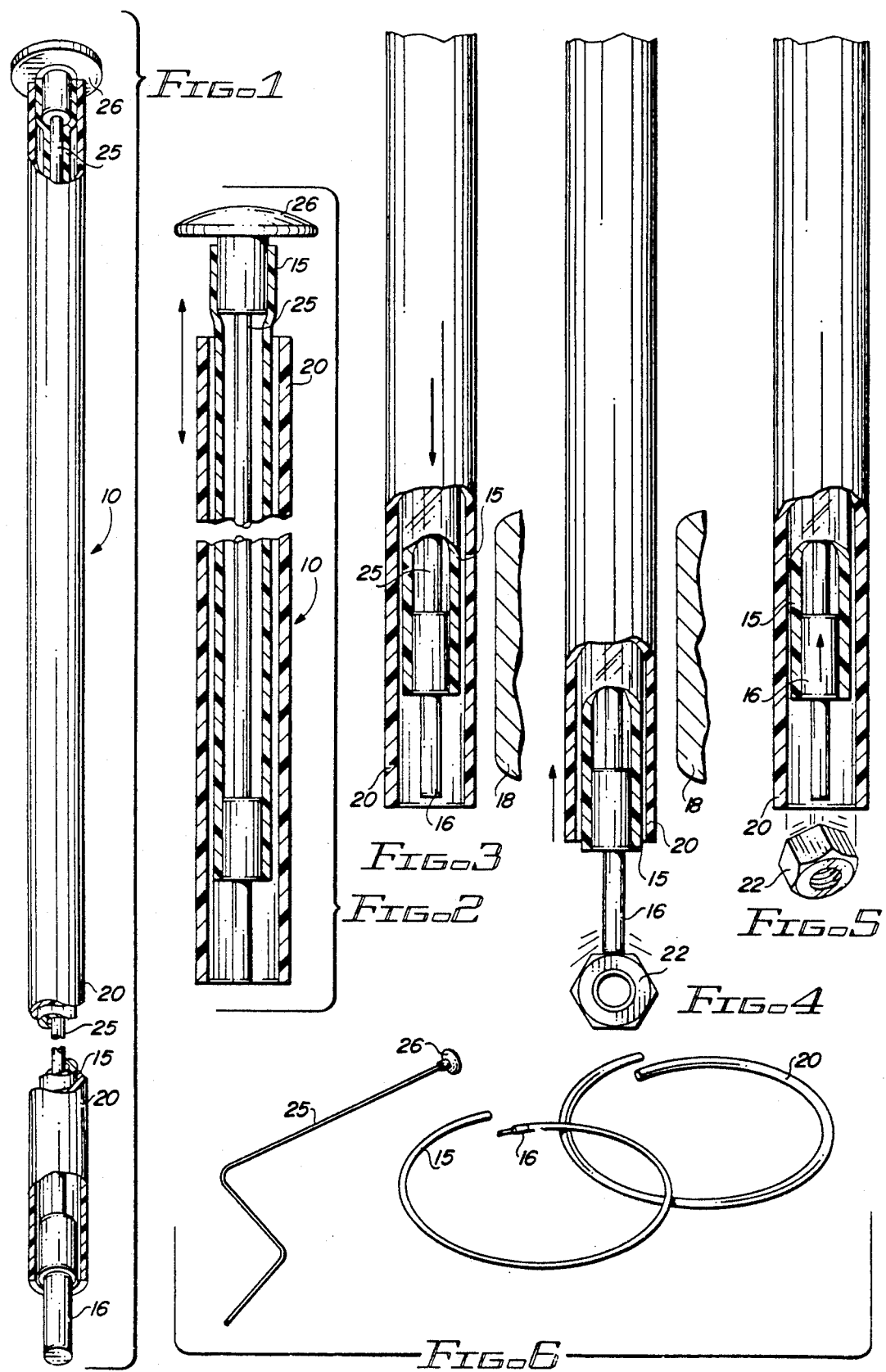

MAGNETIC PICKUP TOOL

FIELD OF THE INVENTION

The present invention relates to a magnetic pickup or retrieval tool for retrieving magnetically attractable objects such as screws, bolts and the like from highly inaccessible places.

BACKGROUND OF THE INVENTION

A rather wide variety of magnetic pickup tools for retrieving magnetically attractable objects are known which include a somewhat flexible shaft for manipulating a magnet on the end of the shaft into an otherwise inaccessible area. Such tools are often employed in tight places surrounded by metal parts which of course are also magnetically attractable. Therefore, it is often difficult to control the positioning of the magnet on the tool in such situations and particularly so since the flexible shaft causes the magnet to be drawn toward such metal parts.

Various magnetic devices are known for varying the strength of a magnet and include compound magnet systems where the relative orientation of two or more magnets is adjusted to adjust the magnetic force. Additionally, magnetic tools are known where the distance between the magnet and the working face is adjusted to decrease the magnetic force applied at the face. However, these types of devices often do not provide sufficient magnetic force and do not substantially decrease the lateral magnetic attraction toward surrounding magnetically attractable materials. U.S. Pat. No. 4,813,729 discloses a magnetic retrieval tool which is said to overcome the foregoing problems. Additionally, U.S. Pat. No. 512,381 shows a magnetic pickup tool in which the magnet is slidably located in an outer sleeve. Although the tool of this patent does overcome the problem of the magnet being attracted to other unwanted magnetic articles, the shaft of this tool is not flexible and thus severely limits the use of the tool. A somewhat similar arrangement is shown in U.S. Pat. No. 2,471,764 and it appears that the tool of this patent is also subject to the problem of the shaft being totally inflexible. In U.S. Pat. No. 2,683,618 there is also shown an automatic pickup device which provides for shielding of the magnet and also incorporates a somewhat flexible shaft. Interestingly, the tools of these patents are quite complicated in construction and obviously rather costly to make.

Accordingly, it is a principal object of this invention to provide a magnetic pickup tool in which the flexibility of the shaft can be widely varied and in which the magnet which is employed may be moved from an inoperative to an operative position in order to prevent the magnet from being attracted to unwanted metal objects during positioning of the tool. A further object of this invention is to provide a magnetic pickup tool which is simple in construction and of very low cost. These and other objects of the invention will become more apparent as this specification proceeds.

SUMMARY OF THE INVENTION

In accordance with one form of the invention, a magnetic pickup tool is provided which includes a length of highly flexible tubing with a permanent magnet secured to one end of the tubing. Removably positioned within the interior of this highly flexible tube is a stiffening means such as a length of iron wire which is of about the same length as the flexible tubing, the stiffening means being bendable but when bent the stiffening means takes a "set". A second length of flexible tubing completely surrounds the first or inner tubing and is slidable thereon. The function of the outer tube is to surround the magnetic tip when the tool is in the process of being positioned to pick up an object so as to prevent the magnetic tip of the tool from being attracted to an unwanted metal object. After the tool has been positioned at or near the object to be picked up, the user then grasps the outer tube and pulls it away from the magnetic tip exposing the tip to make contact with the desired object. A further feature of the tool is that the stiffening means is removable. Thus, where the tool is being used to retrieve an object which requires that the tool have a very high degree of flexibility, the stiffening means is removed and then the entire length of the tool can be bent in virtually any type of configuration.

DESCRIPTION OF THE DRAWINGS

FIG. 1 is an elevational view of a preferred embodiment of the tool of the present invention which is shown in partial cross-section;

FIG. 2 is an enlarged partially cross-sectional view of the tool of FIG. 1;

FIG. 3 is a partial view in partial cross-section showing the tool being placed near a metal object such as an engine block;

FIG. 4 is a partial view in partial cross-section showing the tool picking up a nut near an engine block;

FIG. 5 is a partial view in partial cross-section showing release of the nut from the magnetic tip of the tool; and FIG. 6 is a prospective view of the basic components of the tool of the present invention.

DESCRIPTION OF THE PREFERRED EMBODIMENT

Referring to the drawings in which like reference numerals designate like or corresponding parts throughout the various views, there is shown in FIGS. 1 and 2 a magnetic pickup tool 10 in accordance with the present invention. Tool 10 includes a length of a first highly flexible tube 15 with a permanent magnet 16 secured to one end of tube 15. As shown, a portion of magnet 16 is inserted into one end of tube 15 and can be secured in a permanent fashion by means of a suitable adhesive. Tube 15 can be formed of, for example, an elastomer such as natural or synthetic rubber or a synthetic plastic such as polyvinylchloride (PVC). A PVC tube being brightly colored to promote visability is preferred.

Positioned within tube 15 is removable stiffening means 25 which is of smaller diameter than the inside diameter of tube 15 so that it is readily inserted and removed and which, as shown, is a length of metal wire such as iron, copper or brass and of substantially the same length as tube 15. It is important that wire 25 be such that it is flexible or bendable but also must be able to take a "set" as shown in FIG. 6. That is, when the wire is bent to a certain shape, it will retain that shape until the shape is deliberately changed. Also, as shown in FIGS. 1 and 2, one end of the wire is provided with a cap 26, a portion of which fits snugly into the interior of the tube 15. The cap makes it easy to remove the wire from the tube and then reinsert it.

A second outer tube 20 surrounds the first tube 15 and is slidable thereon. Tube 20 is made of the same or similar material as tube 15 and again is highly flexible as is tube 15. The purpose of tube 20 is to surround the magnetic tip when the tool is in the process of being positioned to pick up an object. For example, as shown in FIG. 3, when the tool 10 is in the process of being positioned to pick up an object, and in this instance an object which is near metal engine block 18, the outer tube 20 shields the magnet and prevents it from being attracted to engine block 18. Then, as shown in FIG. 4, when the end of the tool is near the object to be retrieved, in this instance nut 22, the user grasps outer tube 20 and pulls it away from the magnetic tip exposing the tip to make contact with nut 22. This can be done with one hand. Thereafter, as shown in FIG. 5, once the object has been retrieved and brought to a suitable location, the outer tube can then be moved so that it again surrounds the magnetic tip 16 and the tool is ready for additional use.

The pickup tool of this invention is highly adaptable to retrieving metal objects in a wide variety of situations. For example, when the wire 25 is in place in the tool, the tool can be bent into a complex shape such as for example that shown in FIG. 6 and it will retain that shape until the object has been retrieved, at which time the tool can then be straightened and ready to use again. However, there may well be other situations where a very high degree of flexibility of the retrieval tool is required. In such a situation, the stiffening means, wire 25, can be completely removed from the tool and then the magnetic pickup tool, because of the very high degree of flexibility of tubes 15 and 20, will be able to follow almost any course to retrieve the desired object.

I claim:

1. A magnetic pickup tool comprising a first length of a flexible tube with a permanent magnet secured to one end thereof, removable stiffening means positioned within said first tube, said stiffening means being of smaller diameter than the inside diameter of said tube and of substantially the same length thereof, a second flexible tube surrounding said first tube and slideable thereon whereby said second tube may be moved in a direction to fully surround said magnet and in an opposite direction to expose said magnet, said stiffening means being bendable into a variety of shapes and when bent to a desired shape will retain said shape until deliberately changed.

2. The tool of claim 1 wherein said stiffening means is a metal wire and wherein said tubes are formed of an elastomer.

3. The tool of claim 2 wherein said stiffening means is iron wire and said tubes are made of polyvinylchloride.

* * * * *